United States Patent [19]
Cameron

[11] 3,746,410

[45] July 17, 1973

[54] JOURNAL BEARING

[75] Inventor: John F. Cameron, Mississauga, Ontario, Canada

[73] Assignee: Hatch Associates Ltd., Toronto, Ontario, Canada

[22] Filed: Aug. 10, 1971

[21] Appl. No.: 170,451

[52] U.S. Cl. .................................................. 308/72
[51] Int. Cl. ............................................ F16c 23/00
[58] Field of Search ..................... 308/72, 29, 237 A

[56] References Cited
UNITED STATES PATENTS

| | | | |
|---|---|---|---|
| 288,489 | 11/1883 | Proctor | 308/237 A |
| 376,900 | 1/1888 | Morell | 308/237 A |
| 1,495,660 | 5/1924 | Ziegler | 308/72 |
| 2,761,746 | 9/1956 | Abel | 308/72 |

Primary Examiner—Charles J. Myhre
Assistant Examiner—Frank Susko
Attorney—J. A. Legris

[57] ABSTRACT

A journal bearing is disclosed having a fully sealed bearing surface with provision for fluid cooling and pressure lubrication. The bearing can accommodate shaft misalignment and can embody a wide variety of mounting configurations.

8 Claims, 10 Drawing Figures

INVENTOR.
JOHN F. CAMERON
BY
J. A. Legris
REG. NO. 115540
ATTORNEY

PATENTED JUL 17 1973
3,746,410
SHEET 2 OF 3
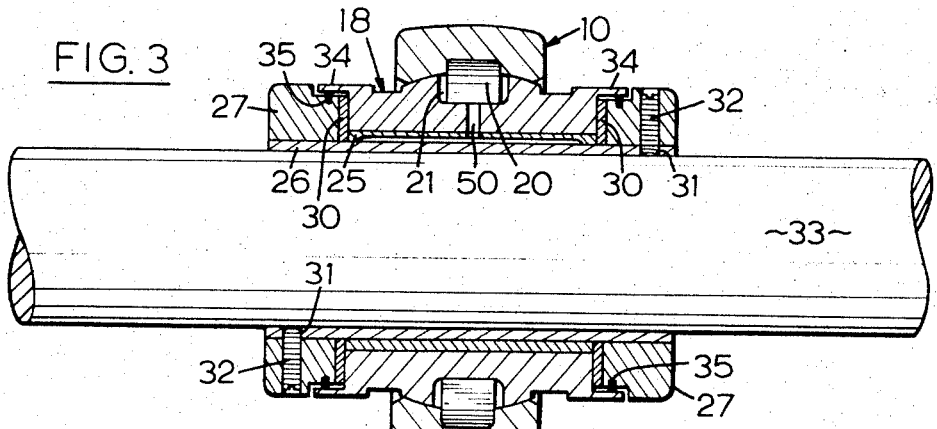
FIG. 3
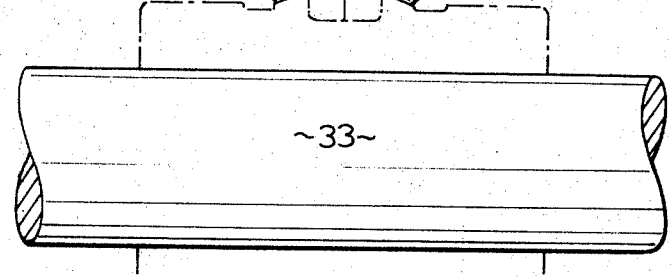
FIG. 5
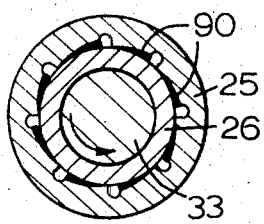
FIG. 4
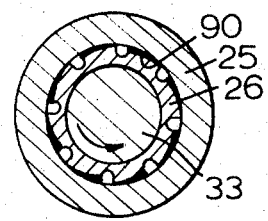
FIG. 9
FIG. 10
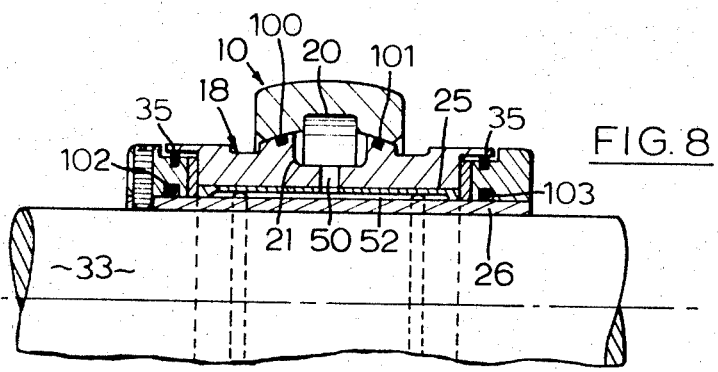
FIG. 8
INVENTOR.
JOHN F. CAMERON
BY J. A. Legris
REG. NO. 15540
ATTORNEY

JOURNAL BEARING

BACKGROUND OF THE INVENTION

The present invention is directed to journal bearings and, in particular, to journal bearings embodying sealed bearing surfaces which are not affected by shaft material, shaft size, surface finish, irregularities and the like.

Conventional journal bearings are available in a wide variety of forms to meet the various needs for which such bearings are suitable. These varying needs have resulted in journal bearings which can be mounted to supporting structure in a wide variety of ways and are generally classified by the material from which the bearing sleeve is made; either bronze or babbitt. Conventional journal bearings over which the present invention is an improvement are all designed to be used with cold-rolled steel shafting and are either made in one piece in which event the shaft is inserted in the bearing in an axial direction or is made in two pieces having a removable cap so that the bearing may be applied to the shaft by securing the cap to the base around the shaft.

All of these bearings suffer from the diadvantage that the tolerances between the bearing material and the shaft must be relatively coarse in order to accommodate standard cold-rolled steel shafting of standard sizes. Such steel shafting is not always of an exact size, is not always perfectly round, does not always have an ideal surface finish and does not always have an ideal hardness for the shaft surface itself to constitute an ideal bearing surface. Since inconventional journal bearings, the shaft surface is one of the rubbing surfaces of the bearing, the result is a compromise which produces less than ideal conditions in most instances.

Further, bearings of the conventional kind allow for the escape of lubricant and for the ingress of dirt and foreign matter with the result that rapid wear is a frequent occurrence.

SUMMARY OF THE INVENTION

It is, accordingly, a principal objective of the present invention to provide a journal bearing to support relative rotation between a shaft and surrounding structure which provides for sealed bearing surfaces in which all conditions for an ideal bearing can be optimised by the bearing manufacturer and which are completely unaffected by tolerances in the shafting, by shaft material and surface irregularities. Further, provision is made for the bearing to accommodate shaft misalignment relative to the normal bearing axis without disturbing the bearing seals.

BRIEF SUMMARY OF THE DRAWINGS

The preferred embodiments of the invention are illustrated in the accompanying drawings in which like reference numerals denote like parts in the various views and in which:

FIG. 3 is an axial section of the assembled bearing of FIG. 1 with the mounting structure not shown;

FIG. 4 is a detailed view of a portion of FIG. 3 showing an alternative form of construction;

FIG. 5 is an axial section of a bearing embodying the present invention and showing an alternative form of mounting arrangement;

FIG. 8 is an axial section of a bearing constructed in accordance with the present invention and showing an alternative form of lubrication system; and FIGS. 9 and 10 are diagrammatic views showing alternative arrangements for lubricating the bearing surfaces.

DETAILED DESCRIPTION OF THE PREFERRED EMBODIMENTS

Figures 1, 2:
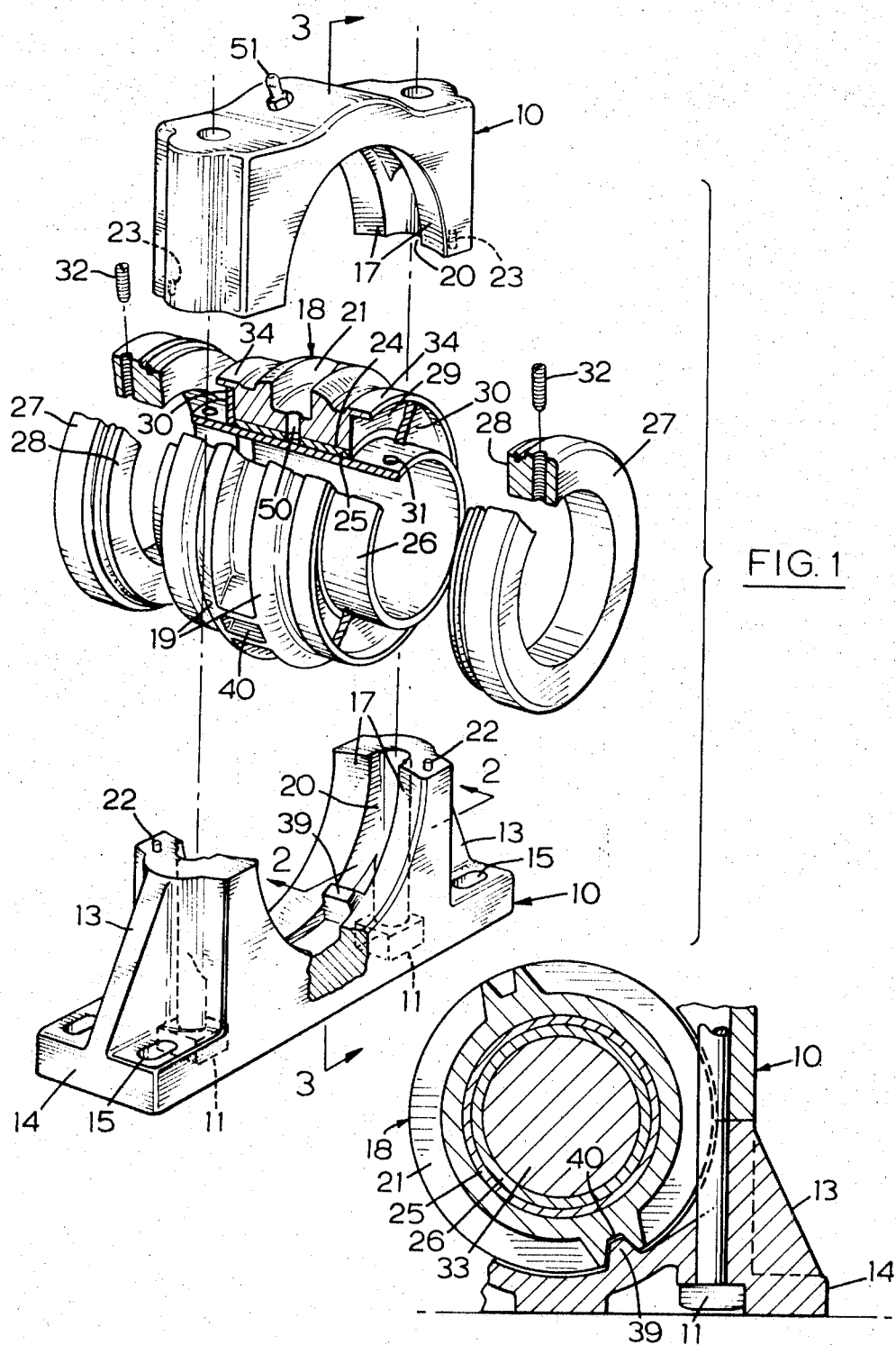
FIG. 1 is a perspective, exploded view of a journal bearing embodying the present invention.
FIG. 2 is a radial section of a portion of the assembled bearing of FIG. 1.

A typical form of the present invention is illustrated in FIGS. 1, 2 and 3.

Figure 6:
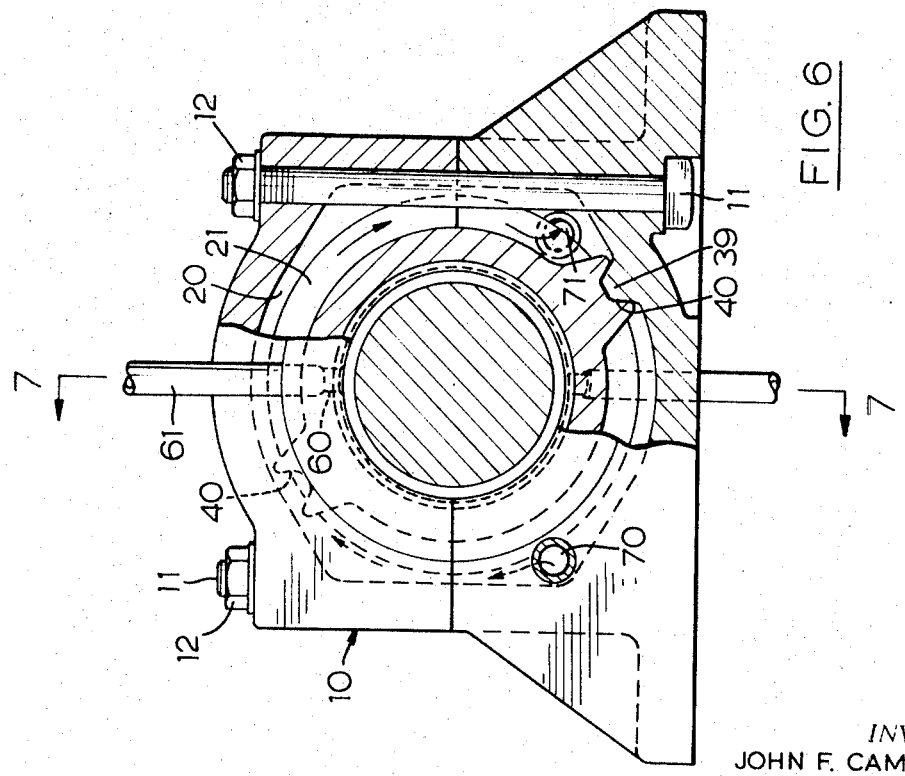
FIG. 6 is a part radial section of a bearing similar to that shown in FIG. 1 illustrating a pressure lubricating system and a second fluid cooling system.

Turning first to FIG. 1, the journal bearing of the present invention can be seen to include a separable outer housing 10 which is split into at least two portions which may be secured together by conventional bolts 11 and nuts which are not illustrated in FIG. 1 but which may be seen at 12 in FIG. 6.

The external configuration of the outer housing 10 is of little importance but, conveniently, it may be provided with reinforcing webs 13, a substantially planar base 14 and mounting apertures 15 through which the base may be secured to appropriate supporting structure.

The outer housing is provided with a central aperture, the internal surface 17 of which is part spherical so that when it is secured together by the bolts 11, it will mate with and support an inner housing 18 which is provided with a complementary, part spherical external surface 19 seating within the part spherical surface 17 of the outer housing 10.

The outer housing 10 is also provided with a circumferential groove 20 which is formed in the internal part spherical surface. The inner housing 18 is provided with a circumferential groove 21 formed in the external part spherical surface thereof so that when the internal housing is supported within the external housing, the grooves 20 and 21 are in communication with one another as can be clearly seen in FIG. 3.

To ensure that the two external housing parts are accurately aligned with one another so that the part spherical surface 17 is maintained truly part spherical in the assembled condition, locating pins 22 may be provided on one housing part to engage sockets 23 formed in the other housing part as can be seen in FIG. 1.

The internal housing 18 is provided with a bore 24 which snugly receives an outer sleeve 25 the internal surface of which is a bearing surface and is a surface of revolution. Within the outer sleeve 25 is an inner sleeve 26, the external surface of which is a bearing surface and is a surface of revolution. The inner sleeve 26 is of greater axial extent than the outer sleeve 25 and on the ends thereof which project beyond the ends of the outer sleeve 25 are mounted collars 27. Lying between the radial faces 28 of collars 27 and radial faces 29 of inner housing 18 are thrust washers 30. The rotatable inner sleeve 26 is provided with apertures 31 (see FIG. 3) through which set screws 32 carried in collars 27 may be driven to engage a shaft 33.

Axially extending flanges 34 are provided on the inner housing 18 which extend over the adjacent portions of collars 27 when the bearing is assembled as seen in FIG. 3 and seal means of a convenient kind are interposed between these relatively rotating surfaces for purposes which will be subsequently explained. Conveniently, the seal 35 may be of the "piston ring" variety. Alternatively, a rubber lip seal 36 may be held in position by a coil spring 37 seated in a channel 38 formed in the inner housing 18 as can be seen in FIG. 4.

The outer housing 10 and the inner housing 18 are also provided with cooperating means to prevent rotation of the inner housing 18 relative to the outer housing 10 when the shaft and housing are rotating relative to one another. These means may conveniently comprise a lug 39 carried by the outer housing 10 and a socket 40 carried by the inner housing 18.

Desirably, the inner housing 18 will embody a plurality of sockets 40, so that the relative angular position of the inner housing may be varied with respect to the outer housing so that bearing wear may be distributed over the entire circumference of the bearing surface. Two such sockets are shown in FIG. 2 but it will be immediately apparent that three or more may be provided. It will further be apparent that other means to prevent relative rotation between the inner and outer housings may be employed.

Having described the component parts of a preferred embodiment of the journal bearing embodying the present invention, its advantages and functions will be readily understood.

First, it will be appreciated that the bearing surfaces which comprise the external surface of the inner sleeve 26 and the internal surface of the external sleeve 25 can be carefully controlled at the manufacturing source to provide ideal conditions. First, the materials chosen can be selected from any materials which will give desirable bearing properties. The journal bearing is no longer required to employ the external surface of the shaft itself as one of the bearing surfaces and bearing surfaces may be finely machined, polished, plated, or treated in any other way to improve the bearing characteristics of the two surfaces which move relative to one another.

Further, the bearing surfaces do not need to be separated in order to install the bearing upon a shaft. The installation procedure is simply to slide the bearing axially along the shaft which it is desired to support or upon which it is desired to support a rotating structure until the position of the bearing is reached. At this point, the inner housing, the outer sleeve which is stationary relative to the inner housing, the inner sleeve and the two collars 27 will be secured in position by means of the set screws 32 being driven into engagement with the shaft 33 through the apertures 31 provided in the inner sleeve 26 as can be seen in FIG. 3. Thereafter, the two external housing parts 10 will be placed about the inner housing and secured together by means of the bolts 11 and nuts 12 and the lower housing part 10 can then be secured to supporting structure by means of bolts passing through mounting apertures 15. This procedure may, of course, be varied. For example, the bearing may be fully assembled, including the outer housing 10 before it is slid axially onto the shaft and may be secured to supporting structure either before or after the set screws 32 are engaged with the shaft 33. Alternatively, the base portion of the outer housing 10 may be first secured to mounting structure, the sleeves and inner housing then slid along the shaft until the inner housing can seat in the parts spherical surface of the lower half of the outer housing and the upper half of the outer housing may then be secured in place.

Lubrication of the bearing which has so far been described may be achieved in a number of ways.

First, the two communicating circumferential grooves 20 and 21 may be filled at the factory with a lubricant material in the form of an oil or grease and during operation of the bearing, lubricant from this reservoir can flow to the relatively rotating surfaces through a passage 50 extending between the circumferential groove 21 in the inner housing and the inner surface of the external sleeve 25 as can be seen in FIGS. 1 and 3.

Additionally, further lubricant may be added to this reservoir by means of a suitable fitting such as that disclosed at 51 in FIG. 1.

Turning now to FIG. 8, an alternative lubricating arrangement is illustrated. The bearing shown in FIG. 8 is, in most respects, the same as that shown in FIGS. 1 to 3 inclusive. However, the internal surface of the external sleeve 25 is provided with an axially extending groove 52 which extends from a point adjacent one end of the outer sleeve to a point adjacent the opposite end thereof. This groove 52 may be axial, may be zig-zag or helical in configuration as circumstances may indicate. This groove 52 is fed with lubricant from the reservoir formed by circumferential grooves 20 and 21 through passage 50 and serves to distribute the lubricant over substantially the entire bearing surfaces of the sleeves 25 and 26. Further, circumferential grooves may optionally be formed in the internal surface of the outer or external sleeve 25. Two prevent loss of lubricant from the reservoir formed by circumferential grooves 20 and 21, suitable seals such as O-ring seals 100 and 101 may be provided in the mating part spherical surfaces. Further, O-ring or similar seals may be provided at 102 and 103 to prevent loss of lubricant from and the ingress of foreign matter into the bearing surfaces.

As was indicated earlier, the bearing of the present invention may be provided both with a pressurized lubricating system and with a cooling system where circumstances require that these conditions be fulfilled.

Figure 7:
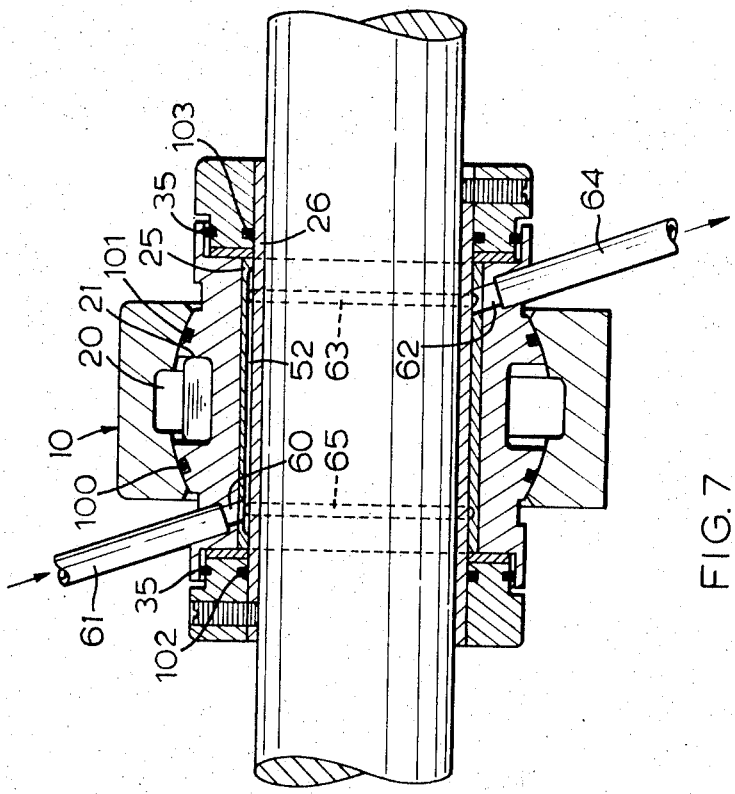
FIG. 7 is a section view taken along line 7—7 of FIG. 6.

Turning now to FIGS. 6 and 7, a bearing substantially in the form of that shown in FIGS. 1 to 3 inclusive is illustrated. Turning first to FIG. 7, a pressurized lubricating system is provided by eliminating the passage 50 extending between grooves 20 and 21 and the bearing surface and, instead, a lubricant inlet passage 60 is formed in the inner housing 18 extending between one end of the axial groove 52 at its inner end and a lubricant inlet fitting 61 at its outer end. A further passage 62 is provided in the inner housing 18 extending from a circumferential groove 63 in the inner surface of the outer sleeve 25 at its inner end and a lubricant outlet fitting 64 at its outer end. Circumferential groove 65 also communicates with the inner end of lubricant inlet passage 60 as shown in FIG. 7.

Thus it can be shown that pressurized lubricant can be fed into fitting 61, through passage 60 into circumferential groove 65 and along axial groove 52 to circumferential groove 63 from where it passes out through passage 62 into lubricant outlet fitting 64. Any suitable lubricant can be employed in this system as is well known in the art.

With the embodiment shown in FIG. 7, it is also convenient to provide for bearing cooling by providing a flow of cooling fluid within the circumferential cavity provided by grooves 20 and 21 in outer housing 10 and inner housing 18. A cooling inlet port may be provided at 70 as seen in FIG. 6 and a cooling outlet port may be provided at 71 for the flow of cooling fluid through the cavity defined by groove 20 and 21 in outer housing 10 and inner housing 18. It will be appreciated that the engagement between lug 39 and socket 40 is such that it does not completely obstruct the circumferential passage defined by groove 20 and 21 and does not, therefore, significantly impede the flow of cooling fluid circumferentially around the bearing housings. In any event, whether the flow within the cavity is circumferential or otherwise, it will serve to extract heat from the bearing components in an efficient manner. The construction illustrated provides for the complete separation of the lubricating and cooling fluids and, accordingly, these fluids may be chosen for their respective properties since they do not come into contact with each other. The seals 100 and 101 will prevent escape of cooling fluid from the reservoir formed by grooves 20 and 21 and seals 102 and 103 will serve the same function as was described with reference to FIG. 8.

As was mentioned earlier, the external housing 10 may take a number of configurations to provide for mounting under different circumstances. For example, the external housing 10 may be provided, as in FIG. 5, with a circumferential spigot 80 which is adapted to fit within a circular aperture 81 in surrounding structure 82. A radial flange 83 provided with bolt apertures 84 enables the outer housing 10 to be secured to the structure 82 by means of bolts 85 and nuts 86. The outer structure 82 may be stationary for the purpose of supporting the bearing or may be a rotatable member carried by the shaft 33.

Further improvement in bearing characteristics may be achieved in accordance with the construction illustrated in FIGS. 9 and 10. In FIG. 9 a shaft 33 is shown carrying an inner sleeve 26 and an outer sleeve 25. The outer sleeve 25 is provided with a plurality of axially aligned, circumferentially spaced grooves 90 of approximately wedge-shaped configuration in cross-section to assist in the formation of approximately wedge-shaped cushions of lubricant to reduce the eccentricity of the inner sleeve 26 relative to the outer sleeve 25 when the shaft 33 and the inner sleeve 26 are rotating.

Alternatively, as shown in FIG. 10, the grooves 90 may be formed on the external surface of the inner sleeve 26 to form the approximately wedge-shaped cushions of lubricant between the relatively rotating bearing surfaces.

The part spherical mating surfaces 17 and 19 provide for limited relative movement between the inner housing 18 and the outer housing 10. This limited movement enables the bearing to accommodate misalignment between the shaft axis and the normal bearing axis. The inner housing 18, however, cannot rotate in the sense of shaft rotation relative to the outer housing 10 and when the term "non-rotatable relative to the outer housing" is used, it is intended to mean only that the inner housing may not rotate relative to the outer housing in the sense that the shaft does so but that it may move in a limited way relative to the outer housing as provided for by the part spherical surfaces 17 and 19 in order to accommodate shaft misalignment.

This limited relative movement does not interfere or disturb the seals 35, 102 or 103 associated with the bearing surfaces since the inner housing, the sleeves and the collars all move as a unit relative to the outer housing 10 under the circumstances. Also, seals 100 and 101 continue to retain sealing engagement with the part spherical surface against which they bear throughout the extent of such limited movement.

From the foregoing description, it will be appreciated that a journal bearing constructed in accordance with the present invention possesses substantial advantages over conventional journal bearings of the kind herein referred to. First, the bearing surfaces may be chosen to provide substantially ideal conditions regardless of the material from which the shaft with which the bearing is associated is made. The bearing is constructed, formed, closed and sealed at it's point of manufacture and there is no reason to disassemble the bearing surfaces at any time during it's installation and service life. Thus, the cleanliness of the bearing surfaces is preserved. Further, lubricant loss and dirt ingress is prevented by means of the seals which are provided for that purpose. The provision of thrust collars enables the journal bearing of the present invention to sustain thrust loads in a manner which is not possible with conventional journal bearings.

While preferred embodiments of the present invention have been described with reference to the accompanying drawings, it will be appreciated that minor modifications are contemplated therein within the scope of the appended claims.

What I claim is:

1. A journal bearing for supporting relative rotation between a shaft and surrounding structure comprising:
   a. a separable, outer housing having an aperture therein;
   b. the aperture having an internal surface that is part spherical;
   c. the housing being separable along a plane containing a diameter of the spherical surface of the aperture;
   d. an inner housing non-rotatable relative to the outer housing having an external part spherical surface that is complementary to the internal part spherical surface of the outer housing and that is adapted to seat therein, the inner housing having a bore;
   e. an outer sleeve stationary relative to the inner housing seated within the bore and having an internal bearing surface which is a surface of revolution;
   f. a rotatable inner sleeve, rotatably mounted within the outer sleeve and having an external bearing surface which is a surface of revolution and which is rotatable relative to the internal surface of the outer sleeve;
   g. the rotatable sleeve being of greater axial extent than the outer sleeve and carrying a radially outwardly extending collar at each end;
   h. means on each collar to firmly engage the collars and, hence, the rotatable inner sleeve to a shaft adapted to be inserted within the rotatable sleeve;
   i. the inner housing having an axially extending flange surrounding each end of the bore and extending over an adjacent portion of the outer surface of the adjacent collar, and, j. a seal proved between the adjacent inner surface of the flange and the outer surface of the collar.

2. A journal bearing as claimed in claim 1 wherein:
a. a circumferential groove is formed in the internal part spherical surface of the outer housing and a communicating, circumferential groove is formed on the external part spherical surface of the inner housing to form a lubricant reservoir within the housings and passage means in the inner housing and the outer sleeve to carry lubricant to the bearing surfaces.

3. A journal bearing as claimed in claim 2 wherein one of the internal bearing surfaces of the outer sleeve external bearing surface of the inner sleeve is provided with a plurality of axially aligned, circumferentially spaced grooves of approximately wedge-shaped cross section to assist in the formation of approximately wedge-shaped cushions of lubricant to reduce the eccentricity of the rotatable sleeve within the stationary sleeve when the rotatable sleeve is rotating.

4. A journal bearing as claimed in claim 1 wherein:
a. a circumferential groove is formed in the internal part spherical surface of the outer housing and a communicating circumferential groove is formed on the external part spherical surface of the inner housing;
b. means are provided in the outer housing to introduce a lubricant to said grooves;
c. and passage means are provided in the inner housing and the outer sleeve to carry lubricant to the internal bearing surface of the outer sleeve.

5. A journal bearing as claimed in claim 3 wherein the inner bearing surface of the outer sleeve has at least one groove formed therein, the groove extending from a point adjacent one end of the outer sleeve to a point adjacent the other end of the outer sleeve and being in communication with the passage means to distribute lubricant along the length of the bearing surface.

6. A journal bearing as claimed in claim 1 wherein:
a. a circumferential groove is formed in the internal part spherical surface of the outer housing and a communicating circumferential groove is formed on the internal part spherical surface of the inner housing;
b. inlet and outlet means are provided in the outer housing to enable a coolant to enter said grooves and be exhausted there from to extract heat from the housings.

7. A journal bearing as claimed in claim 6 wherein:
a. the outer sleeve has a pair of axially spaced, circumferential grooves in the bearing surface and at least one groove therein extending between said circumferential grooves;
b. a lubricant inlet passage in the inner housing and the outer sleeve and communicating with one circumferential groove at its inner end and, at its outer end, with a lubricant inlet fitting carried by the inner housing;
c. a lubricant outlet passage in the inner housing and outer sleeve and communicating at its inner end, with the other circumferential groove and, at its outer end, with a lubricant outlet fitting carried by the inner housing to provide a path for a positive flow of lubricant through the bearing.

8. A journal bearing for supporting relative rotation between a shaft and surrounding structure comprising:
a. a separable, outer housing having an aperture therein;
b. the aperture having an internal surface that is part spherical;
c. the housing being separable along a plane containing a diameter of the spherical surface of the aperture;
d. an inner housing non-rotatable relative to the outer housing having an external part spherical surface that is complementary to the internal part spherical surface of the outer housing and that is adapted to seat therein, the inner housing having a bore;
e. an outer sleeve stationary relative to the inner housing seated within the bore and having an internal bearing surface which is a surface of revolution;
f. a rotatable inner sleeve, rotatably mounted within the outer sleeve and having an external bearing surface which is a surface of revolution and which is rotatable relative to the internal surface of the outer sleeve;
g. the rotatable sleeve being of greater axial extent than the outer sleeve and carrying a radially outwardly extending collar at each end;
h. means on each collar to firmly engage the collars and, hence, the rotatable inner sleeve to a shaft adapted to be inserted within the rotatable sleeve;
i. each said collar extending radially by a distance substantially equal to the radial extent of the inner housing;
j. each end of the inner housing and each collar having radially aligned, mutually facing, annular bearing surfaces separated by thrust washers, and,
k. an axially extending flange on each end of the inner housing extending over an adjacent portion of a collar and seal means extending between the collar and its adjacent flange.

* * * * *